(12) United States Patent
Goldmann et al.

(10) Patent No.: US 10,503,752 B2
(45) Date of Patent: Dec. 10, 2019

(54) DELTA REPLICATION

(71) Applicant: SAP SE, Walldorf (DE)

(72) Inventors: Daniel Goldmann, Mannheim (DE); Mario Andy Mueller, Muehlhausen (DE); Esther Landes, Woerth (DE); Matthias Klauer, Weinheim (DE); Joachim Pfeifer, Buehl (DE); Oleg Loewen, Wiesloch (DE); Qendrim Kuqi, Ludwigshafen (DE); Qian Chen, Heidelberg (DE)

(73) Assignee: SAP SE, Walldorf (DE)

( * ) Notice: Subject to any disclaimer, the term of this patent is extended or adjusted under 35 U.S.C. 154(b) by 392 days.

(21) Appl. No.: 15/373,246

(22) Filed: Dec. 8, 2016

(65) Prior Publication Data

US 2018/0165339 A1 Jun. 14, 2018

(51) Int. Cl.
| | |
|---|---|
| *G06F 16/27* | (2019.01) |
| *G06F 16/245* | (2019.01) |
| *G06F 16/24* | (2019.01) |
| *G06F 16/178* | (2019.01) |
| *G06F 11/14* | (2006.01) |

(52) U.S. Cl.
CPC ............ *G06F 16/27* (2019.01); *G06F 16/245* (2019.01); *G06F 11/1451* (2013.01); *G06F 16/178* (2019.01); *G06F 16/24* (2019.01); *G06F 16/273* (2019.01); *G06F 2201/84* (2013.01)

(58) Field of Classification Search
CPC ...... G06F 16/27; G06F 16/128; G06F 16/245; G06F 11/1451; G06F 11/1446; G06F 2201/84; G06F 3/065
USPC ................................. 707/625, 646, 649, 654
See application file for complete search history.

(56) References Cited

U.S. PATENT DOCUMENTS

| | | | | |
|---|---|---|---|---|
| 8,996,465 | B2 * | 3/2015 | Mielenhausen | G06F 16/2343 707/639 |
| 9,696,939 | B1 * | 7/2017 | Frank | G06F 3/065 |
| 2003/0182313 | A1 * | 9/2003 | Federwisch | G06F 11/2066 |
| 2009/0125692 | A1 * | 5/2009 | Yamamoto | G06F 11/1451 711/162 |
| 2010/0257403 | A1 * | 10/2010 | Virk | G06F 11/1453 714/15 |
| 2011/0066594 | A1 * | 3/2011 | Srivastava | G06F 16/1844 707/625 |
| 2017/0053357 | A1 * | 2/2017 | Bowman | G06Q 40/12 |
| 2017/0220658 | A1 * | 8/2017 | Goldmann | G06F 16/27 |

* cited by examiner

*Primary Examiner* — Dennis Truong
(74) *Attorney, Agent, or Firm* — Mintz Levin Cohn Ferris Glovsky and Popeo, P.C.

(57) ABSTRACT

A system, a method, and a computer program product for replication of data changes are disclosed. Based on a received data query, at least one attribute of stored data is identified for replication. The attribute corresponds to at least one parameter of the received query. Data stored at a first time and data stored at a second time are retrieved. The second time is subsequent to the first time. Data stored at the first time is compared to the data stored at the second time to determine a delta difference between the data stored at the first and second times. The computed delta difference is selected for the identified attribute. The selected computed delta difference is replicated in response to the received query.

18 Claims, 7 Drawing Sheets

DELTA REPLICATION

TECHNICAL FIELD

This disclosure relates generally to data processing and, in particular, to replication of data changes/deltas in computing systems.

BACKGROUND

Many companies rely on data to conduct their daily activities. The data can include company data, employee data, financial data, sales data, and/or many other types of data. The data is used to perform a variety of tasks, which can include generation of reports, compilation and/or presentation of various information, data, etc., execution of functionalities of software applications, performing various transactions, etc.

Data can be stored in a variety of ways and is periodically updated through entry of new data, deletion of old data, modification of existing data, and/or in any other way. To retrieve data, a query may be generated that can contain various parameters defining specifics of data that is desired. The queries can be entered using various software applications and their associated user interfaces. If retrieval of only changed data is required, existing systems will typically retrieve all data (changed and not changed), which can significantly burden processing resources, networks, and overall performance of users' computing systems. Thus, there is a need for a way to effectively determine and retrieve changes to the data without extracting other data.

SUMMARY

In some implementation, the current subject matter relates to a computer-implemented for replication of data changes. The method can include identifying, based on a received data query, at least one attribute of stored data for replication in response to the received data query. The attribute can correspond to at least one parameter of the received data query. The method can also include retrieving data stored at a first time and data stored at a second time, where the second time is subsequent to the first time, comparing the data stored at the first time and the data stored at the second time to determine a delta difference between the data stored at the first and second times, selecting the computed delta difference for the identified attribute, and replicating the selected computed delta difference in response to the received query. At least one of the identifying, the retrieving, the comparing, the selecting, and the replicating can be performed on at least one processor of at least one computing system.

In some implementations, the current subject matter can include one or more of the following optional features. The identified attributes can correspond to at least one of the following: a segment of stored data and a field in a segment of stored data. The segment attribute can include at least one of the following: a complete segment attribute for replicating all fields of a segment, a time-based segment attribute for replicating at least one field of a segment valid at a predetermined time, a delta irrelevant segment attribute for excluding a segment for determining the delta difference, and a mandatory segment attribute for requiring replication all fields of a segment regardless of the determination of the delta difference. The field attribute can include at least one of the following: a delta irrelevant field attribute for excluding at least one field in a segment for determining the delta difference, an exclusion field attribute for excluding all fields in a segment for determining the delta difference, and a mandatory field attribute for requiring replication all fields of a segment regardless of the determination of the delta difference.

In some implementations, the method can also include excluding data from determination of the delta difference upon determination that data does not correspond to the identified attribute(s).

In some implementations, the second time can correspond to a snapshot of stored data at a current time and the first time can correspond to a snapshot of stored at a predetermined time prior to the current time.

In some implementations, the method can also include validating the parameter(s) of the received data query. The identification of attribute(s) can be performed based on determination of validity of the parameter(s).

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide replication of data changes in computing systems.

Figure 1:
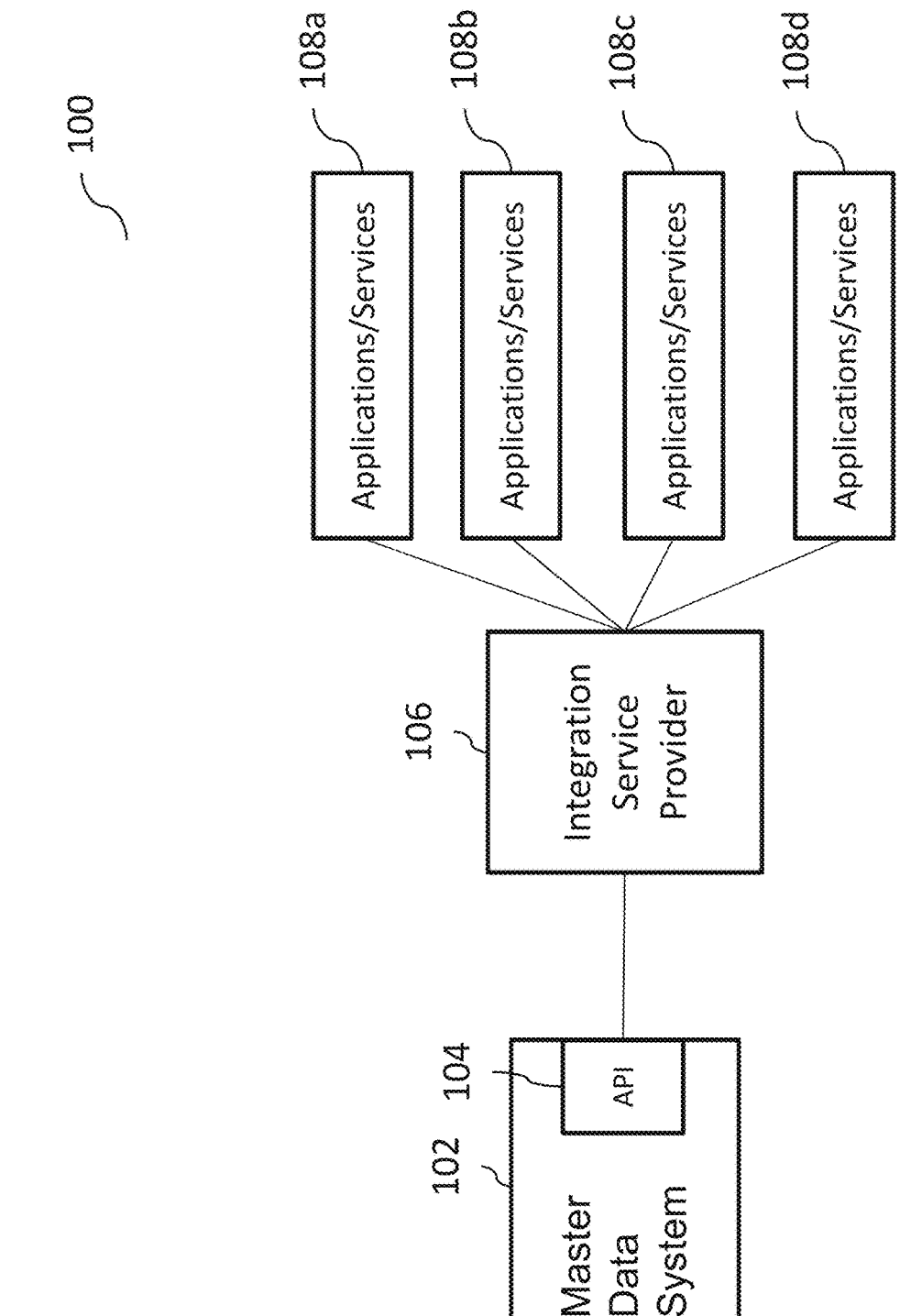
FIG. 1 illustrates an exemplary system that can perform data replication techniques, according to some implementations of the current subject matter.

FIG. 1 illustrates an exemplary system 100 that can perform data replication techniques, according to some implementations of the current subject matter. The system 100 can include a master data system 102, a master data system application programming interface ("API") 104, an integration service provider 106, and a plurality of application/services 108 (a, b, c, d). The master data system 102 can be communicatively coupled, via the API 104, to the integration service provider 106 and/or the application/services 108 via a communications network, e.g., an Internet, an intranet, an extranet, a local area network ("LAN"), a wide area network ("WAN"), a metropolitan area network ("MAN"), a virtual local area network ("VLAN"), and/or any other network. The network connection of the master data system 102 and the service provider 106 and/or applications/services 108 can include at least one of the following: a wireless, a wired, and/or any other type of connection. The components 102-108 can be implemented using a personal computer, a laptop, a server, a mobile telephone, a smartphone, a tablet, and/or any other type of device and/or any combination of devices. The browser components 102-108 can be separate components and/or can be integrated into one or more single computing components.

Further, components 102-108 can include databases, storage locations, memory, etc. and/or any combination thereof. The master data system 102 can be a source system that can store data and can allow querying the stored data (e.g., using SQL queries, and/or any other queries) by the applications/services 108, which can represent one or more target systems. The data can be replicated to the applications/services 108 for the purposes of analysis, processing, storage, etc. by the applications/services 108. The applications/services 108 can also provide data (whether new data, processed data, etc.) to the master data system 102 for processing, storage, etc.

In some implementations, the master data can store data in a plurality of data segments. The segments can be representative of specific portions of data and/or all data. For example, in an employee master data, segments can be identified by attributes that refer to personal information, employment information, etc. Each segment can include one or more fields that can contain specific data values. In the above example, the fields can be identified by attributes that refer to employees' first names, last names, etc. Field values can contain values corresponding to specific employees' first names, last names, etc.

In a non-limiting example, the master data system 102 can be an employee central ("EC") system that can be used for processing/storage of employee master data. The applications/services 108 can be third party systems, e.g., payroll, benefits providers, that can require use of the EC employee data to trigger their own services, processes, etc. The integration service provider 106 can be a middleware that can provide connection and integration between the master data system 102 and the applications/services 108. For example, the integration service provider can be SAP Hana Cloud Integration (as developed and available from SAP SE, Walldorf, Germany). The API 104 can include be a SOAP-based web service inside the EC and can be used to retrieve employee master data out of EC. The API 104 can be used to synchronize master data between EC and other on-demand and/or on-premise applications. It can return data about new employees and/or about changes of employee data. Replication of employee master data by calling the API 104 can occur synchronously, which can mean that the response can be immediately returned. Further, the API 104 can be a query based API within EC that can be used to extract master data, based on the requests received from the applications/services 108. A data response generated by the API can be structured based on data structures in the master data system 102.

The API 104 can support full transmission and delta transmission. In full transmission, the API 104 can replicate complete employee data including future and historic data independently if the data was changed since the last replication or not. In delta transmission the API 104 can only return elements which have been created, changed, deleted, etc. since the last replication. The API 104 can be used to setup a full transmission query for the purposes of master data synchronization and uploading the master data into one or more applications/services 108 that requested the master data. With this first synchronization, all data in the master data system 102, including historical data, can be transmitted to the requesting applications/services 108. Subsequent to the synchronization, only changed data can be transmitted to the requesting applications/services 108. Further, selected and/or all delta changes (i.e., changes to master data since a predetermined point in time) can be transmitted by the API 104 to the applications/services 108. To transmit such delta changes, a timestamp can be provided to the API 104, which can be used to determine what delta changes have occurred to the master data, retrieve such delta changes, and transmit them to the applications/services 108. In some implementations, the API 104 can return the master data using action codes to indicate which segments of the master data were changed and previous values to indicate which attributes were changed. For example, use of a parameter "changedSegmentsOnly" can limit results to changed segments and exclude all unchanged segments that are not required.

In some implementations, the current subject matter can allow further refining the searching and replication of changed data capabilities. In particular, the current subject matter system, when generating results containing changed data, can include only relevant data (and exclude any other data), thereby reducing the data load. The relevant data can include changes to data segments and/or fields that may have been identified (either by the user and/or by the system). The current subject matter can also explicitly exclude specific data (e.g., segments of data, fields of data), thereby preventing generation of unsupported constellations (e.g., data that can be related, associated, dependent, etc. on other data based on various parameters, identifiers, requirements, etc.). In this case, the current subject matter can exclude consideration of specific fields/segments of data that are not supported in a target system, whereby replication such fields/segments can lead to issues at the target system. Exclusion of fields/segments can also avoid generation of errors when seeking replication of data to target system. Moreover, in addition to generating results representative of delta changes to data in the source system, the current subject matter can also return additional information that may relate to the delta changes (e.g., delta information of payment data can be replicated together with additional information containing employee's first and last names). The delta changes information that is replicated to the target system can relate to a particular time slice (i.e., a period of time), which can include current data and/or any other data.

In some implementation, the query submitted to the source system from the target system via the API 104 can specify one or more parameters, which can include one or more and/or all segments/fields of data that may be relevant for determining changes to the data (i.e., for performing delta calculation), that are to be excluded from the delta calculation, that are to be returned in any case (i.e., regardless of whether they were changed or not), and/or that are to be limited to the a particular time slice (e.g., current time slice). In some implementations, upon receipt of the query from the target system, the API 104 can execute the query on the master data 102 to determine changed segments/fields and/or any other additional data in accordance with the parameters of the query.

In a non-limiting exemplary implementation, an application/service 108 (i.e., a target system) wishes to obtain employee data from the master data system 102. The application/service 108 can generate a query and submit it to the API 104 via the integration service provider 106. The API 104 can execute the query on the master data system 102 to obtain requisite data. The query can include appropriate parameters that identify data that the application/service 108 wishes to obtain. Assuming that the application/service 108 has not previously received any employee data from the master data system 102, the initial load of employee data can be performed using a complete transmission mode of the API 104 (i.e., all requested data can be transmitted to the application/service 108). Subsequent to the initial load of data, any changes to the data can be transmitted to the application/service 108 using a delta transmission mode of the API 104. For example, application/service 108 can request to receive the changed compensation data (e.g., compensation information, pay compensation recurring, pay compensation nonrecurring, etc.) and, in particular, can specify that amount, currency, pay date, frequency, etc. are requested. The application/service 108 can indicate in the query that certain data is not needed, as not being relevant, and thus must be excluded (e.g., changes to other fields of the compensation are not relevant and must be filtered out in the middleware, e.g., the integration service provider 106). The query can also indicate that certain information is required, but that changes to it are not relevant (e.g., additional information of the current personal information and the address information is required, but changes to these segments are not relevant).

In some implementations, the API 104 can control extraction of delta changes from the master data system 102 by selecting fields and segments of data for replication to the application/service 108. The API 104 can restrict delta calculation to selected fields of a segment (e.g., amount, pay date, frequency, etc. of compensation data), to exclude certain segments from delta calculation (e.g., personal information, address information, etc.), to expose only current segment of an effective dated entity, and/or include/exclude other information. The API 104 can return the information requested by the application/service 108 only, thereby significantly reducing the amount of replicated data that needs to be transmitted over the network.

The request query for the employee data example discussed above that can be processed by the API 104 can include the following code:

```
SELECT
    person/personal_information[notDeltaRelevant, onlyCurrent] (last_name, first_name),
    person/address_information[notDeltaRelevant, onlyCurrent](address1, city, country),
    person/employment_information/compensation_information/
        paycompensation_recurring(paycomp_value, currency_code, frequency),
    person/employment_information/paycompensation_non_recurring(pay_date, value, currency_code)
FROM CompoundEmployee
WHERE last_modified_on > lastSynchronizationDate
```

In the above request query, person/personal_information [notDeltaRelevant, onlyCurrent](last_name, first_name) can indicate that segment personal information is requested. The attributes after the path of the segment can indicate that the segment should not be considered in delta calculation ("notDeltaRelevant") and that only a current time slice ("onlyCurrent") is relevant. The list of fields ("last_name", "first_name", etc.) can restrict the data responsive to query of the API to the fields which are requested by the application/service 108. In some implementations, key fields as well as the start and end date of effective dated segments can always be returned and cannot be excluded. Further, in the query person/employment information/compensation_information/paycompensation_recurring(paycomp_value, currency_ code, frequency) can indicate that the pay compensation is requested and per default delta relevant. The fields ("paycomp_value", "currency_code", "frequency") can be limited to the fields contained in the list. Also, as stated above, key fields and the start and end dates can be returned as well (as shown in Appendix A). In some implementations, the above query can be further limited by including a restriction to return only changed segments (e.g., "changedSegmentsOnly") in the request (as shown in Appendix B). This can exclude all segments that are not required in the hierarchy and having an action code of "No change".

In some implementations, the query to the master data 102 can constructed by selecting segment attributes, a list of fields and/or field attributes. The segment attributes can define the behavior of the segment. The segment attributes can include at least one of the following values:

Complete—an attribute with this value can be used when the complete segment should be exposed with all its fields.

OnlyCurrent—an attribute with this value can be applied to effective dated entities, which means that only currently valid time slice(s) can be returned.

NotDeltaRelevant—an attribute with this value can be used to exclude a segment from delta calculation. Any changes to the segment will not lead to a replication of data and the segment will not contain an action code and/or previous values.

Mandatory—an attribute with this value can be used to exclude respective segments from "Changed Segments Only" option (when used). This means that the segments can always be returned, even if they are unchanged and have an action code of "No Change".

The list of fields can specify fields that should be exposed in the segment. If no list is provided, a complete segment with all its fields can be returned. In some implementations, optional field attributes of a field can define certain aspects of the field. The field attributes attributes can include at least one of the following values:

NotDeltaRelevant—a field attribute with this value can be used to exclude the field from delta calculation. Changes to the field will not lead to a replication of the data and no previous values will be calculated.

Exclude—a field attribute with this value can be excluded from the data response and will not have any influence on delta calculation.

Mandatory—a field attribute with this value can be used to exclude the fields from "Changed Fields Only" option. This means that the fields will always be returned, even if they have not changed.

Appendix C contains various non-limiting exemplary implementations of the usage and effect of different attributes (of segments and/or fields) on the result. The examples contain queries submitted to a master data system 102 via API 104, where the master data system 102 contains an employee master data.

Figure 2:
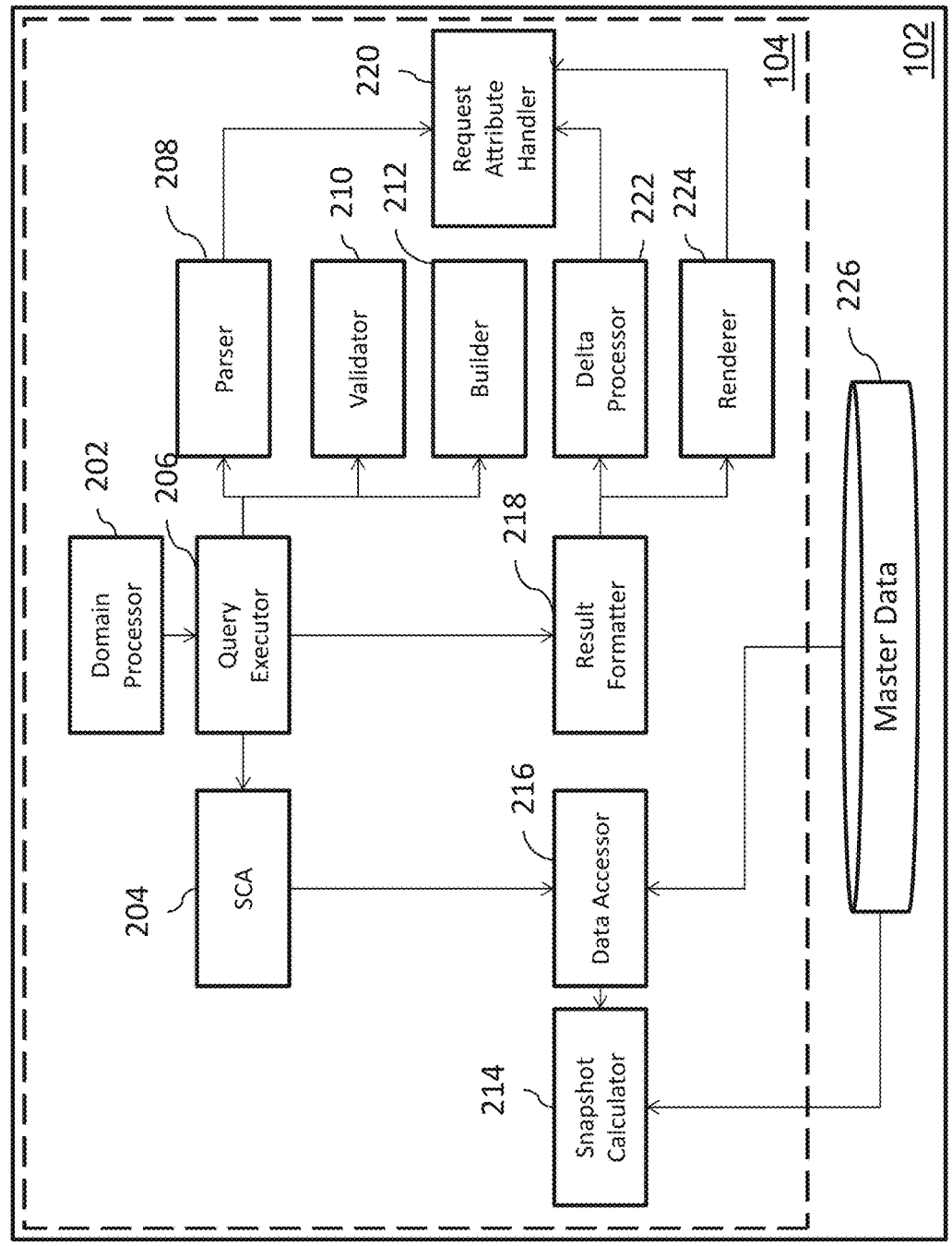
FIG. 2 illustrates an exemplary structure of an application programming interface of a master data system shown in FIG. 1, according to some implementations of the current subject matter.

FIG. 2 illustrates an exemplary structure of API 104 of the master data system 102, according to some implementations of the current subject matter. The API 104 can be communicatively coupled to a master data database 226, which can also be contained in the master data system 102 (alternatively, the database 226 can be communicatively coupled to the master data system 102). The API 104 can be accessed by the applications/services 108 via a network (not shown in FIG. 2). As stated above, the API 104 can receive queries/requests to retrieve data from the applications/services 108. The queries/requests can be for all data, changed data, and/or any other data that may be stored by the system 102.

The API 104 can include a domain processor 202, an SCA 204, a query executor 206, a parser 208 (e.g., an SQL parser), a validator 210 (e.g., an SQL validator), a builder 212 (e.g., an SQL builder), a snapshot calculator 214, a data accessor 216, a result formatter 218, a request attribute handler 220, a delta processor 222, and a renderer 224 (e.g., an XML renderer). The components 202-224 can be software, hardware, and/or any combination thereof. These components can be communicatively coupled with one another using a communications network, e.g., an Internet, an intranet, an extranet, LAN, WAN, MAN, VLAN, and/or any other network.

In some implementations, the domain processor 202 can receive a request for data. The request can be received from one or more applications/services 108 via a SOAP/HTTP (not shown in FIG. 2) and can be initially processed by a computing framework (not shown in FIG. 2) disposed in the master data system 102. The domain processor 202 can check appropriate permissions (e.g., whether data sought by the application/service 108 can be accessed by/provided to that application service 108). Upon completion of the check, the processor 202 can instantiate and call the query executor 206. The processor 202 can then report (e.g., by returning an XML message) to the computing framework of the master data system 102.

The query executor 206 can perform parsing and validation of the received request for data. The query executor 206 can access parser 208 (e.g., an SFQL/query language parser) for parsing of the received request and validator 210 (e.g., an SQL validator) for validation of the request. Once the parsing and validation are completed, the query executor 206 can use the builder 212 (e.g., an SQL builder) for building a query (e.g., an SQL statement) for the purposes of selection of data (e.g., in the above employee master data example, the data can correspond to employees). Once the building of the SQL statement is complete, the query executor 206 can call the service component architecture ("SCA") command 204 to execute the query.

The result formatter 218, upon receiving an appropriate call from the query executor 206, can initiate calculation of delta (e.g., changes to data). The delta calculation can be performed by the delta processor 222. The delta processor 222 can calculate the delta by comparing a snapshot image of the data (as determined by the snapshot calculator 214) and a current image of data stored in the master data database 226. The result formatter 218 can also call on the renderer 224 to render a response to the query received from the application/service 108. The response can be in an XML message.

The data accessor 216 can read the current data in the master data database 226 and determine a snapshot image of the data based on historical changes in the stored data. The snapshot calculator 214 can be used to generate the snapshot image. The snapshot image can correspond to the data stored in the master data database 226 at the time of the last synchronization timestamp and/or any other predetermined timestamp.

The request attribute handler 220 can be instantiated by the parser 208 subsequent to parsing the request received from the application/service 108. The request attribute handler 220 can identify segment attributes and/or field attributes that may be responsive to the request. Additionally, the request attribute handler 220 can provide an interface for accessing the segment and/or field attributes. The interface can be used by the delta processor 222 and the renderer 224 to check attributes of identified segment(s) and/or field(s). Further, the request attribute handler 220 can determine whether there are any errors present in the received request (e.g., invalid paths, invalid fields, etc.). The errors can be assembled and returned to the requestor (i.e., application/service 108).

Figure 3:
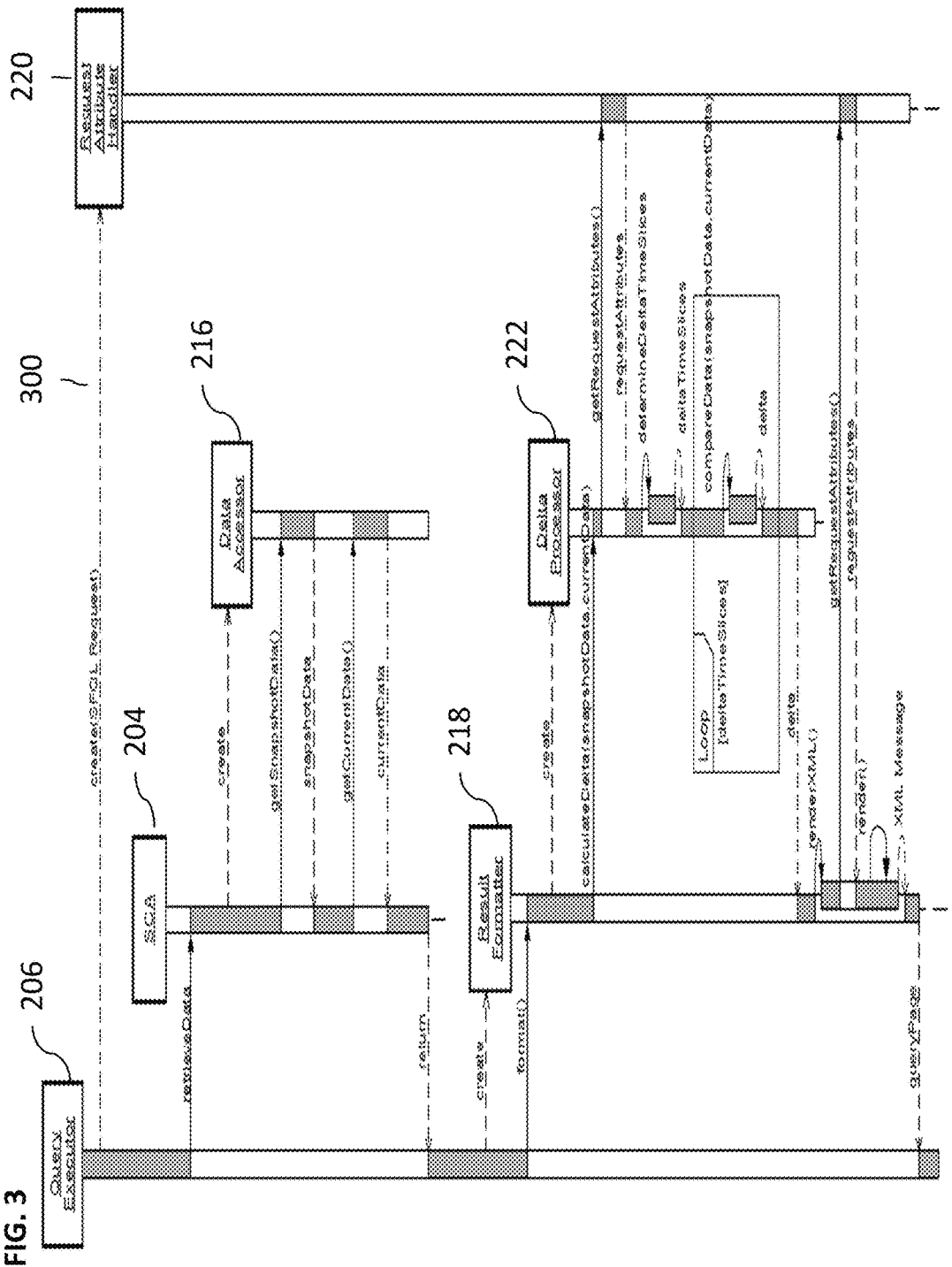
FIG. 3 illustrates an exemplary process diagram for processing a query using components shown in FIG. 2, according to some implementations of the current subject matter.

FIG. 3 illustrates an exemplary process diagram 300 for processing a query using components shown in FIG. 2, according to some implementations of the current subject matter. The query executor 206, upon receiving a request from the domain processor 202, can generate a create(SFQL Request) to the request attribute handler 220. The query executor 206 can also generate a data retrieval request to the SCA 204.

The SCA 204 can access the data accessor 216 to obtain a snapshot of the data that can exist at a particular point in time (e.g., "getSnapshotData( )", which can return "snapshotData"). Further, SCA 204 can also obtain current data as it exists at the time of the received request (e.g., "getCurrentData( )", which can return "currentData"). The snapshot and current data can be accessed by the data accessor 216 from the database 226 (as shown in FIG. 2). The SCA 204 can then return the snapshot and current data to the query executor 206.

The query executor 206 can then access the result formatter 218 (e.g., using "format( )") for the purposes of generating/formatting a response to the received request. The result formatter 218 can call on the delta processor 222 to calculate delta between the snapshot image and the current image of data that has been obtained by the query executor 206 (e.g., using "calculateDelta(snapshotData.currentData)" call). The delta processor 222 can then obtain information about the segment and/or field attributes that may be sought by the received request from the request attribute handler 220 (e.g., using "getRequestAttributes( )" and "requestAttributes" calls). The delta processor 222 can then determine delta time slices (e.g., "determineDeltaTimeSlices" and "deltaTimeSlices"). This process can be performed for one or more attributes identified by the request attribute handler 220. Once the time slices have been determined, the delta processor 222 can perform comparison of the snapshot data image to the current data image (e.g., using "compareData(snapshotData.currentData)") to determine delta changes in the data for the particular attributes. This process can be repeated several times, as there can be several attributes, for each of which a delta change may need to be determined. Upon completion of delta change determination for all requested attributes, the delta processor 222 can return the determined delta changes (e.g., "delta") to the result formatter 218. The result formatter 218 can also access the request attribute handler 220 to obtain attributes (e.g., using "getRequestAttributes( )" and "requestAttributes" calls) for the purposes of rendering (e.g., in XML) a responsive message to the original received request. Once the message (e.g., "XML message") is generated, the result formatter 218 can provide the response (e.g., "queryPage") to the query executor 206. The response can then be further passed on to the original requestor, i.e., application/service 108.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 4:
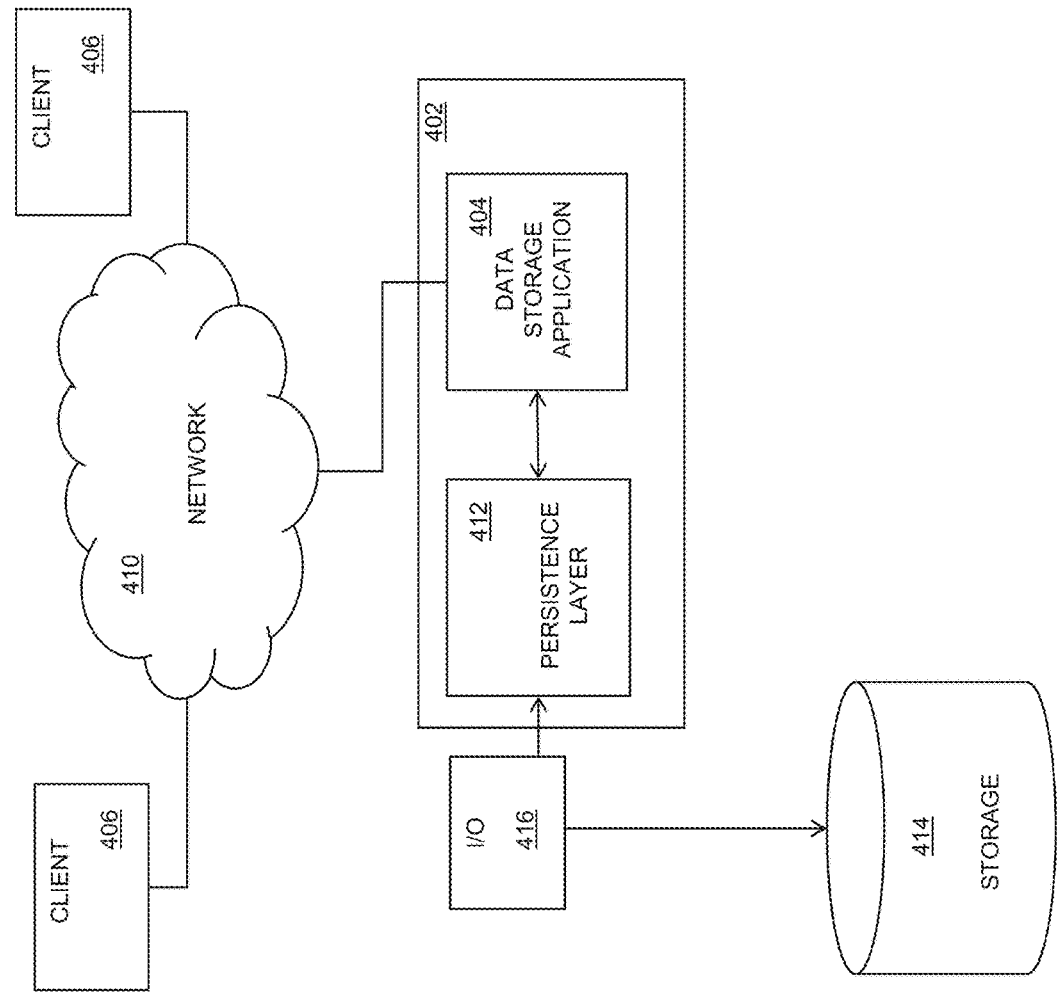
FIG. 4 is a diagram illustrating an exemplary system including a data storage application, according to some implementations of the current subject matter.

FIG. 4 illustrates an exemplary system 400 in which a computing system 402, which can include one or more programmable processors that can be collocated, linked over one or more networks, etc., executes one or more modules, software components, or the like of a data storage application 404, according to some implementations of the current subject matter. The data storage application 404 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 402 as well as to remote users accessing the computing system 402 from one or more client machines 406 over a network connection 410. One or more user interface screens produced by the one or more first modules can be displayed to a user, either via a local display or via a display associated with one of the client machines 406. Data units of the data storage application 404 can be transiently stored in a persistence layer 412 (e.g., a page buffer or other type of temporary persistency layer), which can write the data, in the form of storage pages, to one or more storages 414, for example via an input/output component 416. The one or more storages 414 can include one or more physical storage media or devices (e.g. hard disk drives, persistent flash memory, random access memory, optical media, magnetic media, and the like) configured for writing data for longer term storage. It should be noted that the storage 414 and the input/output component 416 can be included in the computing system 402 despite their being shown as external to the computing system 402 in FIG. 4.

Data retained at the longer term storage 414 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 5:
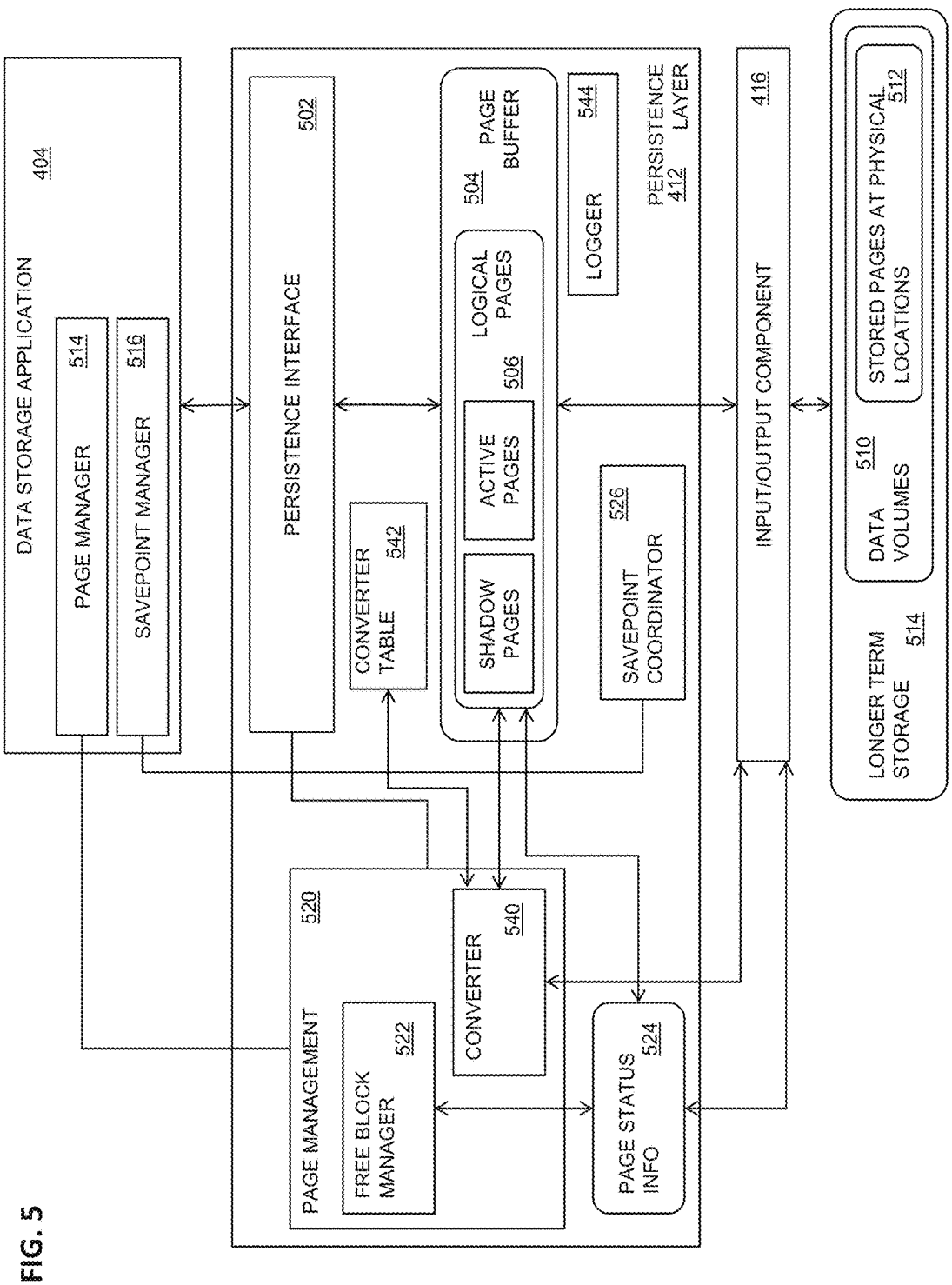
FIG. 5 is a diagram illustrating details of the system of FIG. 4.

FIG. 5 illustrates exemplary software architecture 500, according to some implementations of the current subject matter. A data storage application 404, which can be implemented in one or more of hardware and software, can include one or more of a database application, a network-attached storage system, or the like. According to at least some implementations of the current subject matter, such a data storage application 404 can include or otherwise interface with a persistence layer 412 or other type of memory buffer, for example via a persistence interface 502. A page buffer 504 within the persistence layer 412 can store one or more logical pages 506, and optionally can include shadow pages, active pages, and the like. The logical pages 506 retained in the persistence layer 412 can be written to a storage (e.g. a longer term storage, etc.) 414 via an input/output component 416, which can be a software module, a sub-system implemented in one or more of software and hardware, or the like. The storage 414 can include one or more data volumes 510 where stored pages 512 are allocated at physical memory blocks.

In some implementations, the data storage application 404 can include or be otherwise in communication with a page manager 514 and/or a savepoint manager 516. The page manager 514 can communicate with a page management module 520 at the persistence layer 412 that can include a free block manager 522 that monitors page status information 524, for example the status of physical pages within the storage 414 and logical pages in the persistence layer 412 (and optionally in the page buffer 504). The savepoint manager 516 can communicate with a savepoint coordinator 526 at the persistence layer 412 to handle savepoints, which are used to create a consistent persistent state of the database for restart after a possible crash.

In some implementations of a data storage application 404, the page management module of the persistence layer 412 can implement a shadow paging. The free block manager 522 within the page management module 520 can maintain the status of physical pages. The page buffer 504 can include a fixed page status buffer that operates as discussed herein. A converter component 540, which can be part of or in communication with the page management module 520, can be responsible for mapping between logical and physical pages written to the storage 414. The converter 540 can maintain the current mapping of logical pages to the corresponding physical pages in a converter table 542. The converter 540 can maintain a current mapping of logical pages 506 to the corresponding physical pages in one or more converter tables 542. When a logical page 506 is read from storage 414, the storage page to be loaded can be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 can ensure that changes made in the data storage application 404 are durable and that the data storage application 404 can be restored to a most recent committed state after a restart. Writing data to the storage 414 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 544 can also be included to store the changes made to the data of the data storage application in a linear log. The logger component 544 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 544 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 412 can use a combination of undo log entries (from one or more logs) and shadow paging.

The persistence interface 502 can handle read and write requests of stores (e.g., in-memory stores, etc.). The persistence interface 502 can also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 544 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 544 can write a database log (or simply referred to herein as a "log") sequentially into a memory buffer in natural order (e.g., sequential order, etc.). If several physical hard disks/storage devices are used to store log data, several log partitions can be defined. Thereafter, the logger 544 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 404 can use shadow paging so that the savepoint manager 516 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 6:
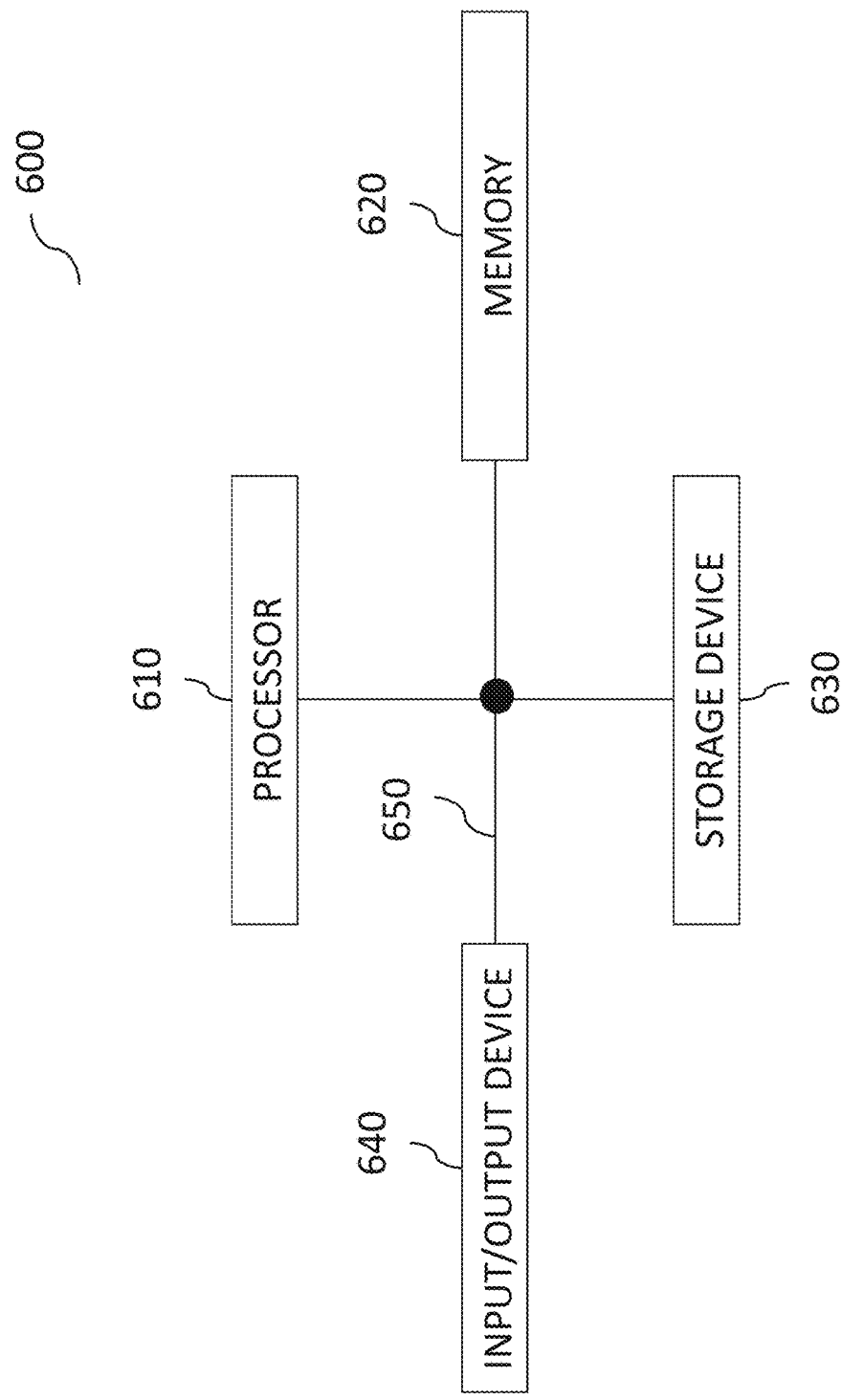
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
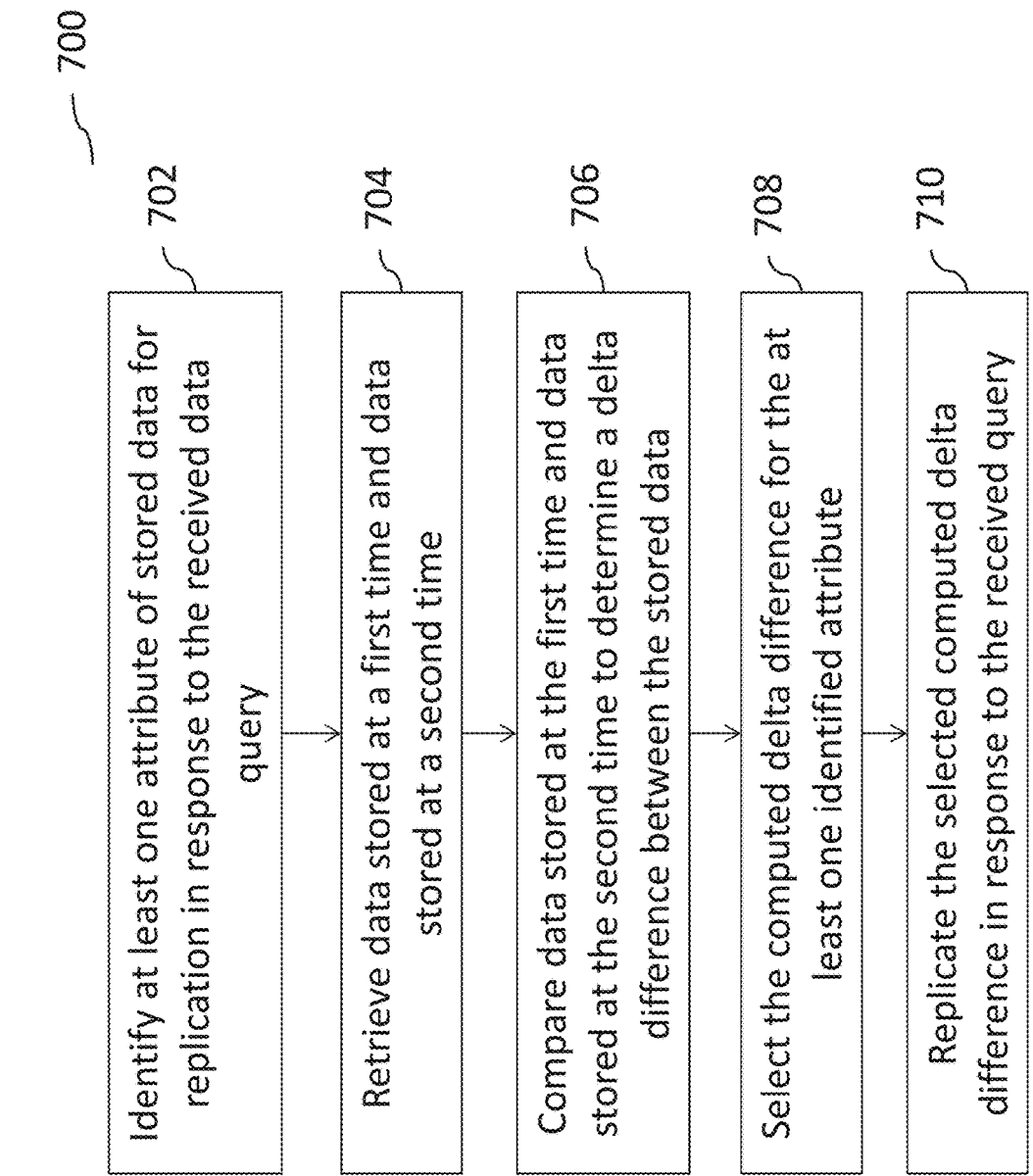
FIG. 7 is an exemplary method, according to some implementations of the current subject matter.

FIG. 7 illustrates an exemplary method 700 for, according to some implementations of the current subject matter. At 702, at least one attribute of stored data can be identified for replication in response to a received data query. The attribute can correspond to at least one parameter of the received query. The query can be received by the API 104 of the master data system 102 from one or more applications/services 108 (as shown in FIG. 1). The attributes can include segment attributes and/or field attributes. The query can be seeking data changes since a particular time and/or any other additional information. The API 104 can validate parameters of the query to ensure that the query can be processed and results can be returned/replicated to the applications/services 108.

At 704, data stored at a first time and data stored at a second time can be retrieved from a database that can be part of the master data system 102. The second time (e.g., current time or time at which query was received and/or generated by the applications/services 108) can be subsequent to the first time (e.g., past time and/or time at which last synchronization of data in the database 226 (as shown in FIG. 2) occurred).

At 706, the data stored at the first time and the data stored at the second time can be compared. Based on the comparison, a delta difference between the data stored at the first and second times can be determined. This can be performed by the delta processor 222, as shown in FIG. 2.

At 708, the computed delta differences corresponding to the identified attribute(s) can be selected. These attributes can dictate which data changes/delta changes are to be returned/replicated in the response to the query from the applications/services 108.

At 710, the selected computed delta differences can be returned/replicated to the applications/services 108 in response to the received query.

In some implementations, the current subject matter can include one or more of the following optional features. As stated above, the identified attributes can correspond to at least one of the following: a segment of stored data and a field in a segment of stored data. The segment attribute can include at least one of the following: a complete segment attribute for replicating all fields of a segment, a time-based segment attribute for replicating at least one field of a segment valid at a predetermined time, a delta irrelevant segment attribute for excluding a segment for determining the delta difference, and a mandatory segment attribute for requiring replication all fields of a segment regardless of the determination of the delta difference. The field attribute can include at least one of the following: a delta irrelevant field attribute for excluding at least one field in a segment for determining the delta difference, an exclusion field attribute for excluding all fields in a segment for determining the delta difference, and a mandatory field attribute for requiring replication all fields of a segment regardless of the determination of the delta difference.

In some implementations, the method can also include excluding data from determination of the delta difference upon determination that data does not correspond to the identified attribute(s).

In some implementations, the second time can correspond to a snapshot of stored data at a current time and the first time can correspond to a snapshot of stored at a predetermined time prior to the current time.

In some implementations, the method can also include validating the parameter(s) of the received data query. The identification of attribute(s) can be performed based on determination of validity of the parameter(s).

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

APPENDIX A

```
<person>
  <action>NO_CHANGE</action>
  <person_id>1501</person_id>
  <personal_information>
    <start_date>2016-01-01</start_date>
    <end_date>9999-12-31</end_date>
    <first_name></first_name><last_name>Dalta</last_name>
  <personal_information>
  <address_information>
    <start_date>2016-04-01</start_date>
    <end_date>9999-12-31</end_date>
    <address_type>home</address_type>
    <country>USA</country>
    <address1>Main Street</address1>
    <city>San Diego</city>
  </address_information>
  <employment_information>
    <action>NO_CHANGE</action>
    <user_id>281</user_id>
    <compensation_information>
      <action>NO_CHANGE</action
      <start_date>2016-04-01</start_date>
      <end_date>9999-12-31</end_date>
      <paycompensation_recurring>
        <action>CHANGE</action>
        <start_date>2016-04-01</start_date>
        <end_date>9999-12-31</end_date>
        <pay_component>SALERY</pay_component>
        <currency_code>USD</currency_code>
        <frequency>MON</frequency>
        <pay_component_type>AMOUNT</pay_component_type>
        <paycompvalue>2200.0</paycompvalue>
        <paycompvalue_previous>2000.0</paycompvalue_previous>
      </paycompensation_recurring>
    </compensation_information>
    <compensation_information>
      <action>NO_CHANGE</action>
      <start_date>2016-01-01</start_date>
      <end_date>2016-03-31</end_date>
      <paycompensation_recurring>
        <action>NO_CHANGE</action>
        <start_date>2016-01-01</start_date>
        <end_date>2016-03-31</end_date>
        <pay_component>Salary</pay_component>
        <currency_code>USD</currency_code>
        <frequency>MON</frequency>
        <pay_component_type>AMOUNT</pay_component_type>
        <paycompvalue>2000.0</paycompvalue>
      </paycompensation_recurring>
    </compensation_informaiton>
    </paycompensation_non_recurring>
      <action>DELETE</action>
      <pay_component_code>SPOT</pay_component_code>
      <pay_date>2016-03-31</pay_date>
      <senquence_number>1</sequence_number>
      <currency_code>USD</currency_code>
      <pay_component_type>AMOUNT</pay_component_type>
      <value>5000.0</value>
    </paycompensation_non_recurring>
  </employment_infomation>
</person>
```

APPENDIX B

```
<person>
  <action>NO_CHAGE</action>
```

```xml
<person_id>1501</person_id>
<personal_information>
   <start_date>2016-01-01</start_date>
   <end_date>9999-12-31</end_date>
   <first_name>Steve</first_name>
   <last_name>Delta</last_name>
</personal_information>
<address_information>
   <start_date>2016-04-01</start_date>
   <end_date>9999-12-31</end_date>
   <address-type>home</address_type>
   <country>USA</country><>
   <address1>Main Street</address1>
   <city>San Diego</city>
</address_information>
<employment_information>
   <action>NO_CHANGE</action>
   <user_id>281</user_id>
   <compensation_information>
      <action>NO_CHANGE</action>
      <start_date>2016-04-01</start_date>
      <end_date>9999-12-31</end_date>
      <paycompensation_recurring>
         <action>CHANGE</action>
         <start_date>2016-04-01</start_date>
         <end_date>9999-12-31</end_date>
         <pay_component>Salery</pay_component>
         <currency_code>USD</currency_code>
         <frequency>MON</frequency>
         <pay_component_type>AMOUNT</pay_component_type>
         <paycomvalue>2200.0</paycompvalue>
         <paycomvalue_pervious>2000.0</paycompvalue_previous>
      </paycompensation_recurring>
   </compensation_information>
   <paycompensation_non_recurring>
      <action>DELETE</action>
      <pay_component_code>SPOT</pay_component_code>
      <pay_date>2016-03-31</pay_date>
      <sqquency_number>1</sequency_number>
      <currency_code>USD</currenty_code>
      <pay_component_type>AMOUNT</pay_component_type>
      <value>500.0</value>
   </paycompensation_non_recurring>
</employment_information>
</person>
```

APPENDIX C

Exemplary Implementation I

Request: person/employment_information/compensation_information. This request can return a complete compensation information and the path building segments person and employment_information with their keys.

```xml
<person>
   <action>NO_CHANGE</action>
   <person_id>1501</person_id>
   <employment_information>
      <action>NO_CHANGE</action>
      <user_id>281</user_id>
      <compensation_information>
         <action>CHANGE</action>
         <start_date>2016-04-01</start_date>
         <end_date>9999-12-31</end_date>
         <seq_number>1</seq_number>
         <created_on>2016-03-28T00:00:00.000Z</created_on>
         <created_by>Johndoe</created_by>
         <last_modified_on>2016-03-28T00:00:00.000Z</last_modified_on>
         <last_modified_by>johndoe</last_modified_by>
         <benefits_rate>0.0</benefits_rate>
         <evemt>P</event>
         <event_previous>H</event_previous>
         <event_reason>PROMOTION</event_reason>
         <event_reason_previous>HIRENEW</event_reason_previous>
         <is_eligible_for_benefits>false</is_eligible_for_benefits>
         <is_eligible_for_car>false</is_eligible_for_car>
         <is_insider>false</is_insider>
         <pay_group>NA-GROUP</pay_group>
         <salaryCurrencyCode>USD</salaryCurencyCode>
      </compensation_information>
      <compensation_information>
         <action>NO_CHANGE</action>
         <start_date>2016-01-01</start_date>
         <end_date>2016-03-31</end_date>
         <seq_number>1</seq_number>
         <created_on>2016-01-02T00;00:00.000Z</created_on>
         <created_by>johndoe</created_by>
         <last_modified_on>2016-01-02T00:00:00.000Z</last_modified_on>
         <last_modified_by>johndoe</last_modified_by>
         <benefits_rate>0.0</benefits_rate>
         <event>H</event>
         <event_reason>HIRNEW</event_reason>
         <is_eligible_for_benefits>false</is_eligible_for-benefits>
         <is_elegible_for_car>false</is_eligible_for_car>
         <is_insider>false</is_insider>
         <pay_group>NA_GROUP</pay-group>
         <salaryCurrencyCode>USD</salaryCurrencyCode>
      </employment_information>
</person<
```

Exemplary Implementation II

Request: person/employment_information/compensation_information[currentOnly]. This request is similar to the Exemplary Implementation I, however, in this case, only the current compensation information is returned.

```xml
<person>
   <action>NO_CHANGE</action>
   <person_id>1501</person_id>
   <employment_information>
      <action>NO_CHANGE</action>
      <user_id>281</user_id>
      <compensation_information>
         <action>CHANGE</action>
         <start_date>2016-04-01</start_date>
         <end_date>9999-12-31</end_date>
         <seq_number>1</seq_number>
         <created_on>2016-03-28T00:00:00.000Z</created_on>
         <created_by>johndoe</created_by>
         <last_modified_on>2016-03-28T00:00:00.000Z</last_modified_on>
         <last_modified_by>johndoe</last_modified_by>
```

```xml
        <benefits_rate>0.0</benefits_rate>
        <evemt>P</event>
        <event_previous>H</event_previous>
        <event_reason>PROMOTION</event_reason>
        <event_reason_previous>HIRENEW</event_reason_previous>
        <is_eligible_for_benefits>false</is_eligible_for_benefits>
        <is_eligible_for_car>false</is_eligible_for_car>
        <is_insider>false</is_insider>
        <pay_group>NA-GROUP</pay_group>
        <salaryCurencyCode>USD</salaryCurencyCode>
      </compensation_information>
    </employment_information>
</person>
```

Exemplary Implementation III

Request: person/employment_information/compensation_information[currentOnly](event, is_insider). This request can return current compensation information but only the key fields, the effective dated information and fields contained in the list.

```xml
<person>
    <action>NO_CHANGE</action
    <person_id>1501</person_id>
    <employment_information>
      <action>NO_CHANGE</action>
      <user_id>281</user_id>
      >compensation_information>
        <action<CHANGE>/action>
        <start_date>2016-04-01</start_date>
        <end_date>9999-12-31</end_date>
        <seq_number<1>/seq_number>
        <event>P</event>
        <event_previous>H</event_previous>
        <is_insider>false</is_insider>
      </compensation_information>
    </employment_information>
</person>
```

Exemplary Implementation IV

Request: person/employment_information/compensation_information[currentOnly](event[exclude], is_insider[exclude], event_reason[exclude]). This request can return a current compensation information and exclude fields contained in the list. Since the segment now only contains unchanged fields, the action code of the segment is "NO_CHANGE" instead of "CHANGE".

```xml
<person>
    <action>NO_CHANGE</action>
    <person_id>1501</person_id>
    <employment_information>
      <action>NO_CHANGE</action>
      <user_id>281</user_id>
      <compensation_information>
        <action>NO_CHANGE</action>
        <start_date>2016-04-01</start_date>
        <end_date>9999-12-31</end_date>
        <seq_number>1</seq_number>
        <created_on>2016-03-28T00:00:00:000Z</created_on>
        <created_by>johndoe</created_by>
        <last_modified_on>2016-03-28T00:00:00:000Z</last_modified_on>
        <last_modified_by>johndoe</last_modified_by>
        <benefits_rate>0.0</benefits_rate>
        <is_eligible_for_benefits>false</is_eleigible_for_benifits>
        <is_eligible_for_car>false</is_eligible_for_car>
        <pay_group>NA_GROUP</pay_group>
        <salaryCurencyCode>USD</salaryCurencyCode>
      </compensation_information>
    </employment_information>
</person>
```

Exemplary Implementation V

Request: person/employment_information/compensation_information[currentOnly, complete](event[notDeltaRelevant], event_reason[notDeltaRelevant]).This request can return a current compensation information. The fields in the list can be excluded from delta calculation. Since these fields were the only changed fields, the segment will now have action code "NO_CHANGE".

```xml
<person>
    <action>NO_CHANGE</action>
    <person_id>1501</person_id>
    <employment_information>
      <action>NO_CHANGE</action>
      <user_id>281</user_id>
      <compensation_information>
        <action>NO_CHANGE</action>
        <start_date>2016-04-01</start_date>
        <end_date>9999-12-31</end_date>
        <seq_number>1</seq_number>
        <created_on>2016-03-28T00:00:00:000Z</created_on>
        <created_by>johndoe</created_by>
        <last_modified_on>2016-03-28T00:00:00:000Z</last_modified_on>
        <last_modified_by>johndoe</last_modified_by>
        <benefits_rate>0.0</benefits_rate>
        <event>P</event>
        <event_reason>PROMOTION</event_reason>
        <is_eligible_for_benefits>false</is_eleigible_for_benifits>
        <is_eligible_for_car>false</is_eligible_for_car>
        <is_insider>false</is_insider>
        <pay_group>NA_GROUP</pay_group>
        <salaryCurencyCode>USD</salaryCurencyCode>
      </compensation_information>
    </employment_information>
</person>
```

Exemplary Implementation VI

Request: person/employment_information/compensation_information[currentOnly, notDeltaRelevant, complete](event, event_reason). This request can return a current compensation information without being considered in delta calculation. From the segment, only the fields event and event_reason are exposed. Since the segment is excluded from delta calculation, it does not contain an action code or previous values for the changed fields.

```xml
<person>
    <action>NO_CHANGE</action>
    <person_id>1501</person_id>
    <employment_information>
      <action>NO_CHANGE</action>
      <user_id>281</user_id>
      <compensation_information>
        <start_date>2016-04-01</start_date>
```

```
        <end_date>9999-12-31</end_date>
        <seq_number>1</seq_number>
        <event>P</event>
        <event_reason>PROMOTION</event_reason>
      </compensation_information>
    </employment_information>
</person>
```

What is claimed:

1. A computer-implemented method, comprising:
identifying, based on a received data query, at least one attribute of stored data for replication in response to the received data query, the at least one attribute corresponding to at least one parameter of the received data query, wherein the at least one attribute corresponds to a field attribute in a segment of stored data, the field attribute including at least one of the following: a delta irrelevant field attribute for excluding at least one field in a segment for determining a delta difference, an exclusion field attribute for excluding all fields in a segment for determining the delta difference, and a mandatory field attribute for requiring replication of all fields of a segment regardless of the determination of the delta difference;
retrieving data stored at a first time and data stored at a second time, the second time being subsequent to the first time;
comparing the data stored at the first time and the data stored at the second time to determine the delta difference between the data stored at the first and second times;
selecting the determined delta difference for the at least one identified attribute; and
replicating the selected computed delta difference in response to the received query;
wherein at least one of the identifying, the retrieving, the comparing, the selecting, and the replicating is performed on at least one processor of at least one computing system.

2. The method according to claim 1, wherein the at least one attribute corresponds to a segment of stored data.

3. The method according to claim 2, wherein the segment attribute includes at least one of the following: a complete segment attribute for replicating all fields of a segment, a time-based segment attribute for replicating at least one field of a segment valid at a predetermined time, a delta irrelevant segment attribute for excluding a segment for determining the delta difference, and a mandatory segment attribute for requiring replication all fields of a segment regardless of the determination of the delta difference.

4. The method according to claim 1, further comprising excluding data from determination of the delta difference upon determination that data does not correspond to at least one identified attribute.

5. The method according to claim 1, wherein the second time corresponds to a snapshot of stored data at a current time and the first time corresponds to a snapshot of stored at a predetermined time prior to the current time.

6. The method according to claim 1, further comprising validating the at least one parameter of the received data query, wherein the identifying of the at least one attribute is performed based on determination of validity of the at least one parameter.

7. A system comprising:
at least one programmable processor; and
a machine-readable medium storing instructions that, when executed by the at least one programmable processor, cause the at least one programmable processor to perform operations comprising:
identifying, based on a received data query, at least one attribute of stored data for replication in response to the received data query, the at least one attribute corresponding to at least one parameter of the received data query, wherein the at least one attribute corresponds to a field attribute in a segment of stored data, the field attribute including at least one of the following: a delta irrelevant field attribute for excluding at least one field in a segment for determining a delta difference, an exclusion field attribute for excluding all fields in a segment for determining the delta difference, and a mandatory field attribute for requiring replication of all fields of a segment regardless of the determination of the delta difference;
retrieving data stored at a first time and data stored at a second time, the second time being subsequent to the first time;
comparing the data stored at the first time and the data stored at the second time to determine the delta difference between the data stored at the first and second times;
selecting the determined delta difference for the at least one identified attribute; and
replicating the selected computed delta difference in response to the received query.

8. The system according to claim 7, wherein the at least one attribute corresponds to a segment of stored data.

9. The system according to claim 8, wherein the segment attribute includes at least one of the following: a complete segment attribute for replicating all fields of a segment, a time-based segment attribute for replicating at least one field of a segment valid at a predetermined time, a delta irrelevant segment attribute for excluding a segment for determining the delta difference, and a mandatory segment attribute for requiring replication all fields of a segment regardless of the determination of the delta difference.

10. The system according to claim 7, wherein the operations further comprise excluding data from determination of the delta difference upon determination that data does not correspond to at least one identified attribute.

11. The system according to claim 7, wherein the second time corresponds to a snapshot of stored data at a current time and the first time corresponds to a snapshot of stored at a predetermined time prior to the current time.

12. The system according to claim 7, wherein the operations further comprise validating the at least one parameter of the received data query, wherein the identifying of the at least one attribute is performed based on determination of validity of the at least one parameter.

13. A computer program product comprising a non-transitory machine-readable medium storing instructions that, when executed by at least one programmable processor, cause the at least one programmable processor to perform operations comprising:
identifying, based on a received data query, at least one attribute of stored data for replication in response to the received data query, the at least one attribute corresponding to at least one parameter of the received data query, wherein the at least one attribute corresponds to a field attribute in a segment of stored data, the field attribute including at least one of the following: a delta irrelevant field attribute for excluding at least one field in a segment for determining a delta difference, an exclusion field attribute for excluding all fields in a segment for determining the delta difference, and a mandatory field attribute for requiring replication of all fields of a segment regardless of the determination of the delta difference;

retrieving data stored at a first time and data stored at a second time, the second time being subsequent to the first time;

comparing the data stored at the first time and the data stored at the second time to determine the delta difference between the data stored at the first and second times;

selecting the determined delta difference for the at least one identified attribute; and replicating the selected computed delta difference in response to the received query.

14. The computer program product according to claim 13, wherein the at least one attribute corresponds to a segment of stored.

15. The computer program product according to claim 14, wherein the segment attribute includes at least one of the following: a complete segment attribute for replicating all fields of a segment, a time-based segment attribute for replicating at least one field of a segment valid at a predetermined time, a delta irrelevant segment attribute for excluding a segment for determining the delta difference, and a mandatory segment attribute for requiring replication all fields of a segment regardless of the determination of the delta difference.

16. The computer program product according to claim 13, wherein the operations further comprise excluding data from determination of the delta difference upon determination that data does not correspond to at least one identified attribute.

17. The computer program product according to claim 13, wherein the second time corresponds to a snapshot of stored data at a current time and the first time corresponds to a snapshot of stored at a predetermined time prior to the current time.

18. The computer program product according to claim 13, wherein the operations further comprise validating the at least one parameter of the received data query, wherein the identifying of the at least one attribute is performed based on determination of validity of the at least one parameter.

* * * * *